United States Patent [19]

Hicks

[11] Patent Number: 4,633,544
[45] Date of Patent: Jan. 6, 1987

[54] SHOPPING CART FRICTION WHEEL ASSEMBLY

[75] Inventor: Jimmy L. Hicks, La Mirada, Calif.

[73] Assignee: P & H Sales Co., Montebello, Calif.

[21] Appl. No.: 711,229

[22] Filed: Mar. 13, 1985

[51] Int. Cl.[4] .............................................. B60B 33/00
[52] U.S. Cl. ...................................... 16/35 R; 188/83
[58] Field of Search ....................... 16/45, 35 R, 35 D; 188/83, 68; 301/6 R, 6 WB; 83/471.3

[56] References Cited

U.S. PATENT DOCUMENTS

| | | |
|---|---|---|
| 2,277,134 | 3/1942 | Nelson . |
| 2,307,874 | 1/1943 | Bilde ................................ 18/42 |
| 2,375,098 | 5/1945 | Geczy . |
| 2,445,607 | 7/1948 | Ghetto ................................ 188/83 |
| 2,665,521 | 1/1954 | Ford ................................ 46/221 |
| 2,704,060 | 3/1955 | Lovett et al. ................... 188/83 |
| 2,787,095 | 4/1957 | Lovett . |
| 2,978,277 | 4/1961 | Gaudry ............................. 301/111 |
| 3,020,091 | 2/1962 | Solomon ............................ 301/63 |
| 3,387,894 | 6/1968 | Louik ................................ 301/63 |
| 3,501,162 | 3/1970 | Toone ........................... 280/11.23 |
| 3,578,812 | 5/1971 | Taussig ............................. 301/63 |
| 3,608,693 | 9/1971 | Stosberg et al. . |
| 3,628,214 | 12/1971 | Mackay ............................ 16/35 |
| 3,807,817 | 4/1974 | Black ................................ 308/190 |
| 3,843,202 | 10/1974 | Lacerte ........................... 301/63 PW |
| 3,894,776 | 7/1975 | Black ............................... 301/63 DD |
| 3,952,786 | 4/1976 | Kreling et al. ................... 152/323 |
| 4,072,373 | 2/1978 | Black ................................ 308/191 |
| 4,095,846 | 6/1978 | Agins ............................... 301/37 R |
| 4,164,251 | 8/1979 | Chung .............................. 152/323 |
| 4,208,073 | 6/1980 | Hechinger ........................ 301/5.3 |
| 4,211,309 | 7/1980 | Ruggiero ......................... 188/83 |
| 4,358,162 | 11/1982 | Schneider et al. .............. 301/63 R |
| 4,375,279 | 3/1983 | Koch . |

FOREIGN PATENT DOCUMENTS 2741122 3/1978 Fed. Rep. of Germany ..... 16/35 R

Primary Examiner—Donald R. Schran
Assistant Examiner—James L. Welfe
Attorney, Agent, or Firm—Kelly, Bauersfeld & Lowry

[57] ABSTRACT

An improved wheel assembly is provided for use with a shopping cart or the like to restrain the cart against rolling movement when parked. The improved wheel assembly comprises a wheel rotatably supported on the cart or the like by a friction bearing unit which imparts a predetermined frictional resistance to rolling movement of the wheel. The magnitude of the frictional resistance is chosen to prevent the cart from rolling about when parked, for example, on a gentle slope while permitting the cart to be pushed about in a normal manner.

6 Claims, 3 Drawing Figures

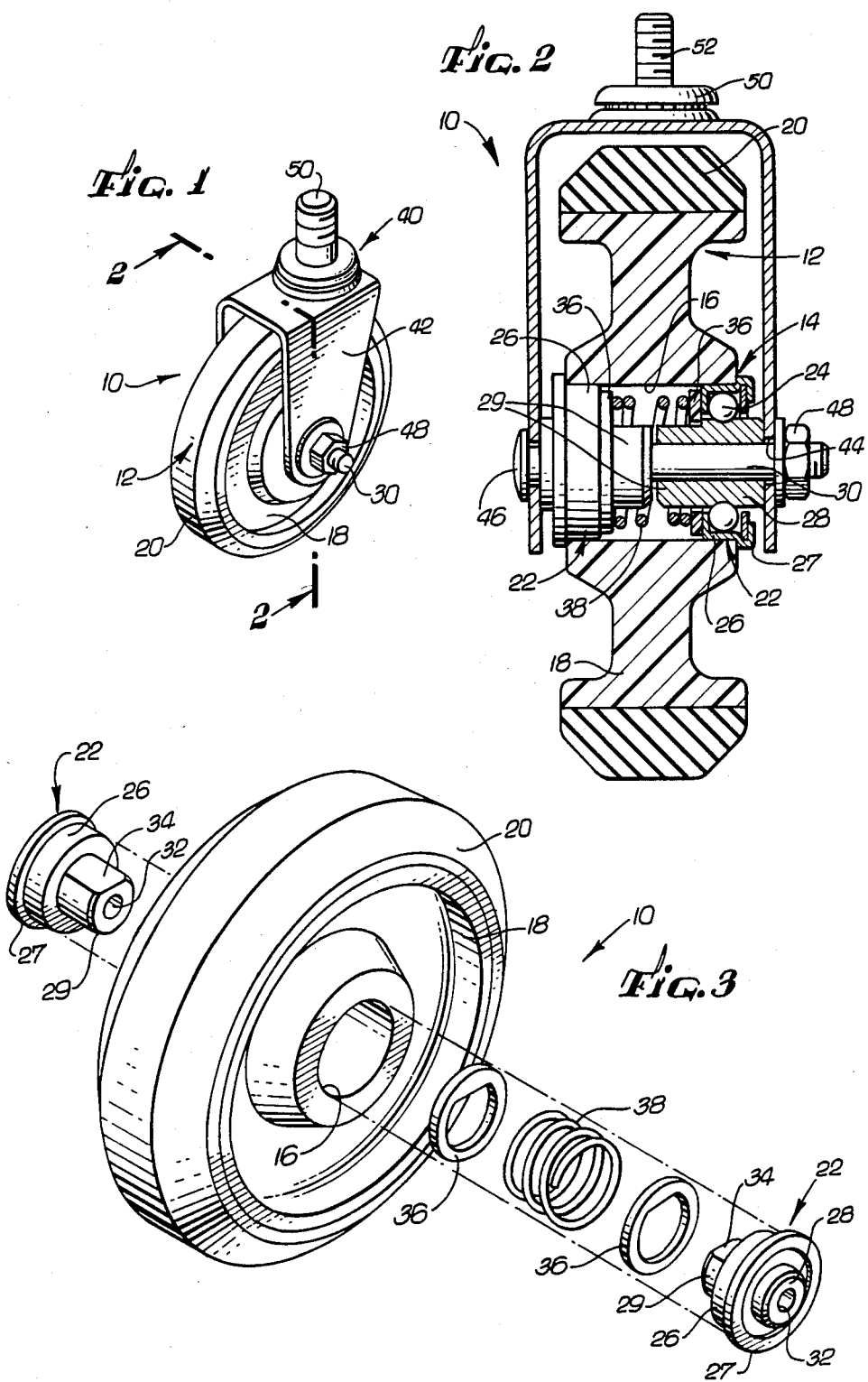

SHOPPING CART FRICTION WHEEL ASSEMBLY

BACKGROUND OF THE INVENTION

The present invention relates to improvements in wheel assemblies of the general type used with modern shopping carts and the like. More particularly, this invention relates to an improved friction wheel assembly having friction means for applying a controlled frictional resistance to wheel rotation sufficient to hold a shopping cart in place while parked yet permit the shopping cart to be rolled about substantially in a normal manner.

Shopping carts are commonly provided by supermarkets, convenience stores, and other retail establishments for use by customers to collect items for purchase and for transporting purchased items, for example, to the customer's automotive vehicle parked typically in a parking lot adjacent to the retail establishment. Such shopping carts typically comprise a metal or plastic basket supported upon a sturdy frame which is in turn supported upon a plurality of wheels for easy rolling movement. The cart design is normally intended to be pushed about by the customer with minimal physical effort yet provide a sturdy cart structure capable of withstanding customer abuse and long-term use.

In the past, shopping cart wheels have been designed for substantially free-wheeling rolling movement to minimize the physical exertion required by the customer to move the shopping cart about a store or parking lot. However, such wheel designs are disadvantageous in some circumstances. For example, such wheel designs permit the shopping cart to be displaced easily from a parked position by minor bumping or jostling as typically occurs in the course of cart loading or unloading. Moreover and perhaps more importantly, free-wheeling designs will not hold the cart in a parked position on a gentle slope or incline as encountered in many parking lots, thereby significantly increasing the difficulty of handling and unloading of purchased items therefrom.

Various brake devices have been proposed for use with shopping carts and the like for releasably locking one or more wheels against rotation to prevent undesired cart rolling movement from a parked position. Such brake devices have typically comprised a movable brake lever or similar component for clamping against the periphery of a cart wheel thereby preventing wheel rotation. While such brake devices can be effective in preventing cart movement when parked, they constitute additional mechanical devices which increase the cost of the shopping cart. Moreover, these brake device require positive customer actuation including setting and releasing which in practice is an annoyance to many customers.

There exists, therefore, a significant need for an improved yet relatively simple and cost effective wheel assembly for a shopping cart or the like, wherein the wheel assembly is designed for holding a shopping in a parked position yet permit the cart to be rolled about substantially in a normal manner, and without requiring customer actuation of any brake device. The present invention fulfills these needs and provides further related advantages.

SUMMARY OF THE INVENTION

In accordance with the invention, an improved wheel assembly is provided for a shopping cart or the like for releasably holding the cart in a parked position yet permitting the cart to be rolled about substantially in a normal manner. The improved wheel assembly comprises a wheel rotatably supported on the cart by a friction bearing unit for imparting a predetermined frictional resistance to wheel rolling movement. The magnitude of this frictional resistance is selected to prevent free-wheeling of the wheel and further to hold the cart in position on a gentle slope or the like as commonly encountered in a parking lot of a retail establishment. However, when the cart is pushed about, the frictional resistance is sufficiently small to accommodate cart movement in a normal manner with minimal physical exertion.

In a preferred form of the invention, the improved friction wheel assembly comprises the wheel of molded plastic or rubber composition or the like with a central bore within which the friction bearing unit is received. This friction bearing unit comprises a pair of roller bearing assemblies, such as ball bearing assemblies, having their outer cages press-fit or otherwise seated within the axially opposed ends of the wheel central bore for rotation of said outer cages with the wheel. The bearing assemblies include inner hubs rotatable with respect to the outer cages and having axially inboard-projecting hub extensions with a noncircular, preferably D-shaped outer periphery. A pair of friction washers having a mating noncircular inner periphery are received respectively about the hub extensions, and a spring reacts compressively between the friction washers to urge said washers with controlled force axially against the outer cages of the bearing assemblies. An axle is press-fit or otherwise seated within the inner hubs of the bearing assemblies, and this axle is in turn adapted for mounting by means of a caster frame or the like onto the shopping cart.

In use, the rolling movement of the wheel and the cages of the bearing assemblies is frictionally resisted by the spring urging the friction washers against said outer cages. By selecting the force applied by the spring together with the material for the friction washers, such as by use of polyvinylchloride washers, the break-out friction between the friction washers and the bearing assembly outer cages is sufficient to hold the cart against rolling movement when parked. However, when the cart is pushed by the customer and the break-out friction is exceeded to initiate wheel rolling movement, the frictional resistance applied to the outer cages is sufficiently small to permit cart movement substantially in a normal manner with minimal physical effort.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating an improved friction wheel assembly for a shopping cart or the like and embodying the novel features of the invention.

FIG. 2 is an enlarged transverse vertical sectional view taken generally on the line 2—2 of FIG. 1; and FIG. 3 is an enlarged exploded perspective view illustrating assembly of the various components forming the improved friction wheel assembly of the invention.

DETAILED DESCRIPTION OF THE PREFERRED EMBODIMENT

As shown in the exemplary drawings, an improved friction wheel assembly referred to generally by the reference numeral 10 is provided for use with a shopping cart (not shown) or the like. The improved wheel assembly 10 includes a wheel 12 rotatably supported by a friction bearing unit 14 (FIG. 2) for frictionally retaining the shopping cart or the like in a parked position while permitting the cart to be rolled about normally with minimal physical effort. Although the wheel assembly 10 will be described herein for use with a shopping cart or the like, it will be understood that the wheel assembly can be used with other types of wheeled structures whenever controlled frictional resistance to rolling movement is desired.

The improved friction wheel assembly 10 when used with a shopping cart, advantageously prevents the cart from rolling down inclined surfaces as commonly encountered in parking lots, and further prevents undesired shifting about of the cart in response to bumping or jostling during loading or unloading. The wheel assembly thus improves and facilitates cart handling without requiring manual adjustments or setting. When the cart is pushed in a normal manner, however, the break-out friction threshold of the friction bearing unit 14 is exceeded upon initiation of cart movement, whereupon the cart can be moved about normally substantially without the user noticing any effect due to the friction bearing unit 14.

As shown in the accompanying drawing FIGS. 1-3, the improved wheel assembly 10 comprises the wheel 12 having a transversely extending central bore 16 for seated reception of the friction bearing unit 14. In the preferred form, the wheel 12 is formed from a molded plastic or rubber-based composition selected to withstand the rigors of use in a shopping cart environment. As shown in FIG. 2, one preferred wheel construction comprises a central wheel member 18 formed from a lightweight material such as polypropylene and carrying a peripheral tread 20 of a wear-resistant material, such as a molded or cast polyurethane.

The friction bearing unit 14 is mounted within the wheel bore 16 and rotatably supports the wheel 12 while providing means for mounting the wheel onto a shopping cart or the like. More particularly, as shown best in FIGS. 2 and 3, the exemplary friction bearing unit 14 comprises a pair of ball bearing assemblies 22 each defined by an annular array of bearing balls 24 encased between an outer annular cage 26 and a cylindrical inner hub 28. The two ball bearing assemblies 22 are seated in facing relation into the opposite axial ends of the wheel bore 16 with the outer cages 26 and secured as by press-fitting or other suitable means into the wheel bore. A radially enlarged thrust shoulder 27 on each cage 26 prevents overinsertion thereof into the wheel bore 16. An alxe 30 is in turn received through aligned bores 32 in the inner hubs 28 of the two bearing assemblies, wherein this axle is secured for rotation with said hubs 28 by press-fitting or other suitable connection therewith. Accordingly, the ball bearing assemblies 22 support the wheel 12 for rotation about the axis of the axle 30.

The inner hubs 28 of the ball bearing assmblies 22 each include a hub extension 29 projecting from the associated bearing balls 24 in an inboard direction relative to the wheel. These hub extensions 29 have a noncircular outer periphery, with a preferred construction including an external flat 34 interrupting an otherwise circular periphery, thereby providing a generally D-shaped cross section, as shown best in FIG. 3. These noncircular hub extensions 29 respectively carry a pair of friction washers 36 which have a noncircular inner periphery for mating reception thereabout whereby the friction washers 36 are constrained against rotation by the hub extensions. A spring 38 such as a helical compression spring, is also carried about the hub extensions 29 and reacts compressively against the friction washers 36 to urge said washers with a predetermined spring force in respective outboard directions axially against the axially inboard faces of the bearing assembly outer cages 26.

The axle 30 of the wheel assembly 10 projects axially in opposite directions beyond the ball bearing assemblies 22 to provide structure for mounting onto the shopping cart or the like. In the exemplary drawings, such mounting structure is provided by a caster frame 40 including an inverted U-shaped bracket 42 having aligned bores 44 through which the axle 30 is received, with said axle being retained within the bridge by a head 46 and a nut 48 at opposite ends thereof. The upper end of the bracket 42 includes a vertical caster pivot 50 of conventional design with an upwardly projecting threaded shaft 52 for appropriate swivel connection to the shopping cart or the like. Alternative mounting structures and alternative axle designs may be used, however, as desired.

In use, when the improved wheel assembly 10 is mounted onto a shopping cart and the cart is in a stationary or parked position, the compression spring 38 urges the friction washers 36 to apply a predetermined frictional force against the bearing outer cages 26 to resist rotation of said cages and the wheel 12. In this regard, the friction washers 36 are selected from a material having a sufficiently high break-out friction threshold to prevent wheel rotation when the cart is parked on a gentle slope or incline of the type commonly encountered in supermarket parking lots and the like, or to prevent unwanted cart shifting in response to normal bumping during a cart loading or unloading procedure. A preferred friction washer material is polyvinylchloride (PVC), and the wheel assemblies would normally be provided in pairs (e.g., the rear wheels) of a typical shopping cart.

The PVC friction washers, however, do not significantly restrict rolling movement of the wheel 12 when the cart is pushed with a sufficient force to exceed the break-out friction threshold. That is, once rolling movement of the wheel 12 is initiated the cart can be rolled about in a normal manner without substantially increasing the effort required to push the cart. When the cart is again stopped, however, rolling movement is again resisted to maintain the parked position until continued movement is desired.

The improved friction wheel assembly 10 of the invention thus provides a simple mechanism for releasably holding a shopping cart and the like in a parked position while permitting the cart to be pushed about substantially in a normal manner, all without requiring the addition or manual actuation of a separate brake device.

A variety of modifications and improvements to the improved friction wheel assembly of the present invention are believed to be apparent to those skilled in the art. Accordingly no limitation on the invention is intended by way of the description herein, except as set forth in the appended claims.

What is claimed is:

1. In a shopping cart wheel of the type having a caster frame including a generally U-shaped bracket having aligned bores formed therein and an upstanding caster pivot shaft projecting from the closed end of the U-shaped bracket for attaching the caster frame to a shopping cart, a wheel having a transversely extending central bore formed therethrough, a cylindrical axle projecting through the central bore of the wheel and the aligned bores of the bracket for mounting the wheel to the bracket, and a pair of axially spaced bearing assemblies seated within the central bore of the wheel at opposite ends thereof and axially inwardly of the bracket, the bearing assemblies supporting the wheel on the axle for relative rotation about the axle, the improvement comprising:

said bearing assemblies having a respective pair of first members seated within said central bore of said wheel generally at opposite ends thereof for rotation with said wheel and having radially enlarged thrust shoulders for engaging the outer periphery of said wheel, and a respective pair of second members mounted on said axle and supporting said respective pair of first members for relative rotation, said second members including a respective pair of axially inboard projecting extensions each having a non-circular cross-section;

a pair of friction washers carried respectively about said extensions, each having a non-circular inner periphery cooperating with said non-circular cross-section of said extensions to prevent relative rotation therebetween; and a compression spring surrounding said axle and having opposite ends disposed between said washers, said opposite ends of said spring applying an axial force against said washers to urge said washers axially against said first members thereby to frictionally resist rotation of said first members relative to said second members and said shopping cart wheel relative to said axle.

2. The improvement of claim 1 wherein said bearing assemblies comprise a pair of ball bearing assemblies.

3. The improvement of claim 1 wherein said friction washers are formed from polyvinylchloride.

4. The improvement of claim 1 wherein said wheel includes a central wheel member of a first material carrying a peripheral tread of a second material.

5. The improvement of claim 2 wherein said friction washers are formed from polyvinylchloride.

6. The improvement of claim 5 wherein said wheel includes a central wheel member of a first material carrying a peripheral tread of a second material.

* * * * *